(12) United States Patent  
Orange et al.

(10) Patent No.: US 9,096,468 B2  
(45) Date of Patent: Aug. 4, 2015

(54) HYDRAULIC BINDER COMPOSITION

(75) Inventors: Gilles Orange, Soisy sous Montmorency (FR); Daniel Joubert, Vineuil Saint Firmin (FR)

(73) Assignee: RHODIA POLYAMIDES INTERMEDIATES, Saint-Fons (FR)

( * ) Notice: Subject to any disclaimer, the term of this patent is extended or adjusted under 35 U.S.C. 154(b) by 2523 days.

(21) Appl. No.: 10/520,711

(22) PCT Filed: Jul. 10, 2003

(86) PCT No.: PCT/FR03/02163  
§ 371 (c)(1), (2), (4) Date: Sep. 1, 2005

(87) PCT Pub. No.: WO2004/007392  
PCT Pub. Date: Jan. 22, 2004

(65) Prior Publication Data  
US 2006/0112863 A1     Jun. 1, 2006

(30) Foreign Application Priority Data  
Jul. 10, 2002 (FR) ..................... 02 08680

(51) Int. Cl.  
*C04B 28/14* (2006.01)  
*B32B 13/02* (2006.01)  
(Continued)

(52) U.S. Cl.  
CPC ................ *C04B 28/14* (2013.01); *B32B 13/02* (2013.01); *C04B 28/02* (2013.01); *C04B 28/34* (2013.01); *E01C 5/065* (2013.01); *C04B 2111/00612* (2013.01); *C04B 2111/27* (2013.01); *C04B 2111/343* (2013.01)

(58) Field of Classification Search  
CPC ................ C04B 28/02; C04B 2111/00612; C04B 2111/27; B32B 13/02; E01C 5/065  
USPC ................................................. 106/801, 802  
See application file for complete search history.

(56) References Cited

U.S. PATENT DOCUMENTS 4,067,758 A * 1/1978 Sommer .......................... 156/91  
4,090,882 A * 5/1978 Rauschenfels .................. 501/28

(Continued)

FOREIGN PATENT DOCUMENTS

DE 197 32 145 1/1999  
EP 0 590 948 4/1994  
WO WO 01/98228 A1 * 12/2001 ............... C04B 28/02

OTHER PUBLICATIONS

Nikiforov, Rheological and physicomechanical properties of heavy concrete with additions of a melt of carboxylic acid, Fiziko-Khimicheska Mekhanika (1992), 21, 14-20.*

(Continued)

*Primary Examiner* — Shuangyi Abu Ali  
(74) *Attorney, Agent, or Firm* — Dentons US LLP

(57) ABSTRACT

The present invention relates especially to a composition for manufacturing an article comprising one or more superposed layers each less than 5 centimeters thick, comprising a hydraulic binder and at least one compound chosen from an organic compound comprising at least two hydrophilic functions and a hydrophobic chain, and a polyamide oligomer. The use of these additives in the presence of hydraulic binder allows the manufacture of articles and coatings with good protection against water uptake, satisfactory water resistance and good mechanical properties such as breaking strength.

15 Claims, 1 Drawing Sheet

(51) Int. Cl.
*C04B 28/02* (2006.01)
*C04B 28/34* (2006.01)
*E01C 5/06* (2006.01)
*C04B 111/00* (2006.01)
*C04B 111/27* (2006.01)
*C04B 111/34* (2006.01)

(56) References Cited

U.S. PATENT DOCUMENTS 5,792,252 A * 8/1998 Sprouts .................. 106/728
6,461,425 B2 * 10/2002 Brown et al. ................. 106/727
2002/0077390 A1 * 6/2002 Gonnon et al. ................... 524/2

OTHER PUBLICATIONS

International Search Report issued in PCT/FR2003/02163 dated Dec. 17, 2003.
Preobrazhenskii et al. "Additive for Concrete Mix", Chemical Abstracts, No. 24 (XP000157386), Dec. 12, 1998.
Iwata et al., "Permeative Waterproofing Compositions for Concrete and Mortar Products", Chemical Abstracts, No. 14 (XP000060429), Apr. 2, 1979.

* cited by examiner

HYDRAULIC BINDER COMPOSITION

This application is an application under 35 U.S.C. Section 371 of International Application Number PCT/FR2003/002163 filed on Jul. 10, 2003.

The present invention relates especially to a composition for manufacturing an article comprising one or more superposed layers each less than 5 centimeters thick, comprising a hydraulic binder and at least one compound chosen from an organic compound comprising at least two hydrophilic functions and a hydrophobic chain, and a polyamide oligomer.

The use of these additives in the presence of hydraulic binder allows the manufacture of articles and coatings with good protection against water uptake and cracking, satisfactory water resistance and good mechanical properties such as breaking strength.

Hydraulic binders are generally cements based on calcium silicates and/or mineral aluminates or plasters based on calcium sulfate used in numerous industries, particularly in the construction field for making the infrastructure of buildings, works of art, apartment buildings or articles such as paving slabs or boards and tiles.

Hydraulic binders may also be reinforced with fibers for the manufactures of fibrocements used, for example, as a material for making articles for covering roofs, pipework or tanks.

Hydraulic binders are manufactured from temperature and converted into mineral compounds capable of reacting with water to produce a binder, which, after curing, forms a compact mass with good mechanical properties.

However, the articles obtained with the hydraulic binders known in the prior art react with water over time. The penetration of water causes efflorescences to the surface of the articles, resulting from carbonatation phenomena, and may possibly lead to a degradation in the mechanical properties. The penetration of water is generally accompanied by a low resistance of the structures to the freezing/thawing cycle.

Similarly, during their drying, thin articles encounter problems of cracking, caused especially by evaporation of water.

Such phenomena can affect the mechanical properties and the durability of the articles or works made with such a binder.

As hydraulic binders presenting such drawbacks, mention may be made of: Portland cement, aluminous or high alumina cement, quick-setting cement and natural cements of Vicalpe and Rapide type.

There is thus a need for a hydraulic binder that has good mechanical performance and low water absorption to overcome the drawbacks mentioned previously.

Figure 1:
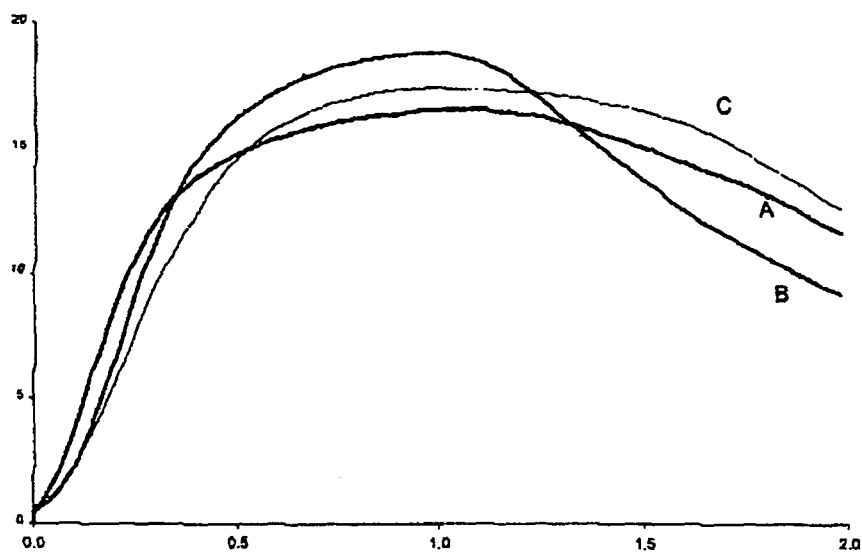
FIG. 1 shows the bending (mm) of fibrocements with polyamide fibers and polyamide oligomers as a function of bending stress (MPa).

It has been found that the use of additives such as an organic compound comprising at least two hydrophilic functions and a hydrophobic chain and/or a polyamide oligomer comprising a low number of repeating units in the presence of hydraulic binder allows the manufacture of articles and coatings with good protection against water uptake and satisfactory water resistance.

The articles or coatings according to the invention obtained using a composition comprising a hydraulic binder and these additives also have good mechanical properties such as breaking strength and resistance to cracking.

Very good results have especially been observed on articles comprising one or more superposed layers each less than 5 centimeters thick.

The present invention relates to a process for manufacturing an article comprising one or more superposed layers each less than 5 centimeters thick, obtained by using a composition comprising a hydraulic binder and at least one compound chosen from:

an organic compound comprising at least two hydrophilic functions and a hydrophobic chain, and a polyamide oligomer comprising less than 20 repeating units, preferably less than 10 repeating units.

Processes for manufacturing an article of cement or fibrocement type are widely known in the prior art. Mention may be made, for example, of the Hatscheck process for the manufacture of fibrocements, or any process known to those skilled in the art for the manufacture of cement materials (for example pouring, injection or spraying).

Generally, the hydraulic binder is mixed with a composition comprising water and additives to form the articles. The composition may optionally be heated and/or blended before leaving it to set to a solid, for example in a mold.

Depending on the articles that it is desired to obtain, a person skilled in the art is entirely capable of manufacturing them from a composition according to the invention comprising a hydraulic binder.

According to the invention, additives such as the said organic compound, the polyamide oligomer or fibers, latex and a water-soluble amphiphilic copolymer may be added to the composition extemporaneously at the time of manufacture of the article. It is also possible for these compounds to be added to the dry hydraulic binder.

Preferably, the composition according to the invention comprises a latex and/or fibers.

According to the invention, the composition preferably comprises from 0.05% to 10% by weight of the said organic compound relative to the total weight of hydraulic binder.

Preferably, the composition comprises from 0.05% to 10% by weight of polyamide oligomer relative to the total weight of hydraulic binder.

In the case where latex is added to the composition according to the invention, it can represent from 0.1% to 15% by weight relative to the total weight of hydraulic binder.

Preferably, the composition may comprise from 0.1% to 10% by weight of fibers relative to the total weight of hydraulic binder.

The said organic compound comprising at least two hydrophilic functions and a hydrophobic chain advantageously comprises acid, acid halide and/or acid anhydride functions. The hydrophobic chain may be chosen from aliphatic, arylaliphatic, aromatic and alkylaromatic chains. This hydrophobic chain may comprise from 2 to 30 carbon atoms and preferably from 4 to 13 carbon atoms.

Preferably, the organic compound is chosen from the group consisting of succinic acid, sebacic acid, adipic acid, octanedioic acid, decanedioic acid, dodecanoic acid, brassylic acid and glutaric acid, and also the salts, derivatives and/or mixtures thereof. For example, the organic compound may be a mixture of adipic acids, glutaric acid and succinic acid or a mixture of acids for the manufacture of adipic acid. The salts of these organic compounds are preferably soluble in an aqueous medium and may be, for example, sodium, potassium, ammonium and/or diamine salts.

According to the invention, the polyamide oligomers are preferably obtained from polyacid monomers, such as adipic acid, polyamine monomers, such as hexamethylenediamine, and/or amino acid monomer such as ε-caprolactam. The polyamide oligomers are preferably obtained from adipic acid and hexamethylenediamine. These two monomers may be used in proportions, for example with an excess of one of the two monomers that may be up to 50%. The polyamide oligomers may bear a function chosen, for example, from phosphates, phosphonates, sulfonates, alkoxysilanes, dicarboxylates, aminocarboxylates, anhydrides, epoxys and diols. An oligomer obtained from adipic acid, hexamethylenediamine and another monomer comprising the functions mentioned above, such as two carboxylic acid functions and one sulfonic acid function, for example the sulfonated isophthalic acid AlSNa, may preferably be used.

Preferably, the latex is a water-insoluble film-forming polymer prepared from at least one ethylenically unsaturated monomer. The said ethylenically unsaturated monomer may be chosen from styrene, butadiene, $C_1$-$C_{12}$ alkyl acrylic or methacrylic esters and the corresponding acids thereof, and vinyl esters. Advantageously, the water-insoluble film-forming polymer is chosen from the group consisting of vinyl or acrylate homopolymers, and copolymers of vinyl acetate, of styrene/butadiene, of styrene/acrylate, of acrylic esters and of styrene/butadiene/acrylate.

According to one particular embodiment of the process of the invention, the composition of the invention comprises a water-soluble amphiphilic copolymer chosen from:

(i) at least one polymer obtained by polymerization
of at least one ethylenically unsaturated monomer (I) of monocarboxylic or polycarboxylic acid type, or a carboxylic acid precursor of cyclic, linear or branched aliphatic or anhydride type, and
of at least one monoethylenically unsaturated linear or branched hydrocarbon-based monomer (II), (ii) at least one polymer derived from the polymerization of at least one monocarboxylic or polycarboxylic acid monomer (I) or cyclic, linear or branched, ethylenically unsaturated aliphatic anhydride, and comprising at least one saturated or unsaturated $C_4$-$C_{30}$ hydrocarbon-based hydrophobic graft, optionally interrupted with one or more hetero atoms, (iii) at least one polymer obtained by chemical modification, for instance esterification, transesterification or amidation, of a precursor polymer on the one hand comprising sites onto which a hydrophobic graft may be grafted, for instance carboxylic acid or ester sites, this graft on the other hand comprising carboxylic acid units or carboxylic acid precursor units.

According to one particular embodiment of the first variant (i), mention may be made firstly of polymers derived from the polymerization:

of at least one monomer (I) having the following formula:

$(R^1)(R^1)C=C(R'^1)—COOH$ (I)

in which formula the radicals $R^1$ and $R'^1$, which may be identical or different, represent a hydrogen atom, a $C_1$-$C_{10}$ hydrocarbon-based radical optionally comprising a —COOH group, or a —COOH group; and of at least one monomer of formula (II) having the following formula:

$(R^2)(R^3)C=C(R^5)(R^6)$ (II)

in which formula:
the radical $R^2$ represents a hydrogen atom or a linear or branched $C_1$-$C_{10}$ alkyl radical optionally substituted with hetero atoms;
the radical $R^3$ represents a linear or branched $C_1$-$C_{10}$ alkyl radical optionally substituted with hetero atoms, or a radical —O—$R^4$, i.e. a vinyl ether, with $R^4$ representing a linear or branched $C_1$-$C_{10}$ alkyl radical optionally substituted with hetero atoms;
the radical $R^5$ represents a hydrogen atom or a linear or branched $C_1$-$C_{10}$ alkyl radical optionally substituted with hetero atoms;
the radical $R^6$ represents a hydrogen atom or a linear or branched $C_1$-$C_{10}$ alkyl radical optionally substituted with hetero atoms;
it being understood that at least one of the radicals $R^2$, $R^3$, $R^5$ or $R^6$ represents a linear or branched $C_1$-$C_{10}$ alkyl radical optionally substituted with hetero atoms.

According to one preferred embodiment of the invention, the monomer of formula (I) is such that one of the radicals $R^1$ is a hydrogen atom; the other radical $R^1$ represents a hydrogen atom, a —COOH group or a group —$(CH_2)_n$—COOH in which n is between 1 and 4, or a $C_1$-$C_4$ alkyl radical; $R'^1$ represents a hydrogen atom, a group —$(CH_2)_m$—COOH in which m is between 1 and 4, or a $C_1$-$C_4$ alkyl radical.

Preferably, one of the radicals $R^1$ represents a hydrogen atom, the other radical $R^1$ represents a hydrogen atom, a —COOH or $(CH_2)$—COOH group or a methyl radical, and $R'^1$ represents a hydrogen atom, a —$CH_2COOH$ group or a methyl radical.

According to a more particular embodiment, the monomer of formula (I) is chosen from acrylic, methacrylic, citraconic, maleic, fumaric, itaconic or crotonic acid or anhydride.

Even more preferably, the monomer of formula (I) is maleic anhydride.

As regards the monomer of formula (II), it may be chosen especially from ethylene, propylene, 1-butene, isobutylene, n–1-pentene, 2-methyl-1-butene, n-1-hexene, 2-methyl-1-pentene, 4-methyl-1-pentene, 2-ethyl-1-butene, diisobutylene (or 2,4,4-trimethyl-1-pentene) or 2-methyl-3,3-dimethyl-1-pentene, or, for the vinyl ethers, from isobutyl vinyl ether, methyl vinyl ether, 1-menthyl vinyl ether, phenyl vinyl ether or octadecyl vinyl ether.

Preferably, the copolymer of formula (i) is derived from the polymerization of maleic anhydride and isobutylene.

It is pointed out that the polymer (i) is obtained more particularly by performing a free-radical polymerization of the monomers (I) and (II).

These compounds are well known to those skilled in the art. Polymers of this type that may be mentioned include the product sold under the name Geropon® T36 (maleic anhydride/diisobutylene), sold by Rhodia Chimie, Sokalan® CP9 (maleic anhydride/olefin) sold by BASF, and the Gantrez resins sold by the company ISP.

In the case where a water-soluble amphiphilic copolymer as described above is added to the composition according to the invention, the said copolymer advantageously represents 0.1% to 5% by weight relative to the total weight of hydraulic binder.

The fibers may be natural or artificial fibers chosen, for example, from the group consisting of glass fibers, carbon fibers, steel fibers, polyamide fibers, polyester fibers, poly (vinyl alcohol) fibers, polypropylene fibers, ceramic fibers and poly(acrylonitrile) fibers, derivatives thereof and/or mixtures thereof.

The polyamide fibers used will advantageously be those usually used in the field of textile articles or yarns and fibers for technical applications. By way of example, the polyamides that may be used in the present invention comprise PA 6.6, PA 6, the copolymer PA 6.6 PA 6, semiaromatic polyamides, such as polyamide 6T, Amodel® (sold by the company Amco), HTN® (sold by the company DuPont), other polyamides 11, 12 and 4-6, for example, copolyamides and/or blends thereof. The polyamides may be of linear or branched structure, for instance the starburst polyamide sold by the company Rhodia under the brand name Technylstar®. According to the invention, it is possible for the polyamide fibers to be pretreated with one or more additives.

Preferably, the composition according to the invention comprises a water-soluble amphiphilic copolymer as described above, a latex and optionally fibers.

Preferably, the hydraulic binder is based on at least one compound chosen from the group consisting of calcium silicate (Portland cement), calcium sulphate (plaster) and calcium phosphate or other phosphates (dental cement). The hydraulic binders may also be packaged as a mixture with other additives such as sand or gravel, for example, to form a ready-to-use mortar.

The present invention also relates to a composition for manufacturing an article comprising one or more superposed layers each less than 5 centimeters thick, comprising a hydraulic binder and at least one compound chosen from:

an organic compound comprising at least two hydrophilic functions and a hydrophobic chain, and a polyamide oligomer comprising less than 20 repeating units and preferably less than 10 repeating units.

This composition may also comprise at least one compound chosen from the group consisting of a latex, a water-soluble amphiphilic copolymer and fibers. The latices, the water-soluble amphiphilic copolymer and the fibers are the same as defined above.

The present invention also relates to an article comprising one or more superposed layers each less than 5 centimeters thick, obtained according to the manufacturing process and/or from the composition as defined above.

The articles according to the invention may be tiles, boards, panels, tubes, blocks, tanks, paving stones, flagstones or partitions, for example, or articles of covering type such as coatings, grouts or screed floors, for example.

Preferably, the article is less than 5 centimeters thick, advantageously less than 2 centimeters and preferably less than or equal to 1 centimeter in thickness.

The present invention also relates to the use of a composition as defined above for the manufacture of an article comprising one or more superposed layers each less than 5 centimeters thick, such as a coating, a covering or a grout.

The present invention also relates to the use of a composition as defined above for the manufactures of en article comprising one or more superposed layers each less than 5 centimeters thick, such as a fibrocement.

EXAMPLE 1

Cement cakes are prepared according to a process consisting in filtering a suspension of cement, fillers and additives in the presence of 0%, 0.5% or 1% of additives chosen from adipic acid alone, or a mixture of adipic acid and latex powder based on acetate-versatate copolymer (50/50 or 25/75, respectively).

The composition used comprises 30% cement (sold by Lafarge under the reference HTS 52.5) diluted in water with a water/cement ratio=3 (W/C).

The slurry comprising the additives is filtered to obtain a cement cake. The cakes are left filtered for 24 hours in an air-conditioned room at 25° C. and with a relative humidity (RH) of 60% before testing. The cakes are approximately 1 centimeter thick.

The results are given in Table 1.

TABLE 1

| Additives | Adipic | Adipic + PAV 50/50 | Adipic + PAV 25/75 |
|---|---|---|---|
| 0% | Pronounced cracking | Pronounced cracking | Pronounced cracking |

TABLE 1-continued

| Additives | Adipic | Adipic + PAV 50/50 | Adipic + PAV 25/75 |
|---|---|---|---|
| 0.5% | Slight cracking | No cracking | Slight cracking |
| 1% | No cracking | No cracking | No cracking |

Adipic + PAV 50/50 represents a mixture of 50% by weight of adipic acid and 50% by weight of PAV.
Adipic + PAV 25/75 represents a mixture of 25% by weight of adipic acid and 75% by weight of PAV.

These results show an improvement in the performance of the cement by adding additives such as adipic acid or adipic acid and acetate-versatate latex (PAV) powder.

EXAMPLE 2

The cement objects obtained in Example 1 are subjected to two tests measuring the water uptake and the water absorption.

The water absorption measurement is performed by exposing the additive-containing cement objects obtained in the above example, dried beforehand for one hour in an oven at 80° C. and weighed, in a chamber with a relative humidity (RH) of 75% at 25° C. for 2, 5 and 12 days.

The water drop test consists in measuring the time required for the penetration of four drops of deionized water deposited, at room temperature and after the same drying process as previously, onto the surface of the cement object obtained in the example.

The results are given in Table 2.

TABLE 2

|  | | Water absorption (75% RH, 25° C.) | | | Water drop test Absorption |
|---|---|---|---|---|---|
|  | of additives | 2 days | 5 days | 12 days | time (s) |
| Control | 0 | 1.28 | 2 | 2.52 | 4 |
| Adipic | 0.5 | 0.75 | 1.38 | 1.81 | 7 |
| Adipic-PAV 50/50 | 0.5 | 0.98 | 1.6 | 2.11 | 16 |
| Adipic-PAV 50/50 | 1 | 0.89 | 1.49 | 1.99 | 34 |
| Adipic-PAV 25/75 | 0.5 | 0.85 | 1.58 | 2.08 | 8 |
| Adipic-PAV 25/75 | 1 | 0.82 | 1.38 | 1.82 | 17 |

These results show that better water resistance is obtained with cement comprising additives such as adipic acid or adipic acid and acetate-versatate latex powder.

EXAMPLE 3

The cement compositions below are prepared using a mixer:

| Composition | 1 | 2 | 3 |
|---|---|---|---|
| Cement sold by Lafarge under the reference HTS 52.5 | 100 | 100 | 100 |
| Fumed silica sold by Elkem under the reference 940 U | 10 | 10 | 10 |
| Adipic acid |  | 0.4 | 2 |
| PAV22 latex |  | 0.3 | 1.5 |
| Geropon T36 |  | 0.3 | 1.5 |
| Water | 50 | 50 | 50 |

A measurement of the density of these suspensions is then performed (by weighing 250 cm³ of this suspension) and it is found that the additive system according to the invention allows a lowering of this density.

Density of the cement paste 1.92 1.64 1.42

This suspension is then cast into 16×4×4 cm molds, so as to prepare specimens on which several types of measurements will be performed. These specimens are left to age for 30 days at room temperature before performing these measurements, which are:

the density of the specimens, to determine the "lightening" capacity of the additive system

| Composition | 1 | 2 | 3 |
|---|---|---|---|
| Density of the cement article after setting and ageing for 30 days | 1.65 | 1.47 | 1.21 | their behavior with respect to water (hydrophobicity or pearling effect) using the water drop test as described in Example 2, after drying the specimens under the same conditions as in Example 2. The test is performed both on the outer surface of the specimen and on the inner surface of the specimen after the said specimen has been broken (test performed at the break).

| | Absorption Time | | |
|---|---|---|---|
| Composition | 1 | 2 | 3 |
| Outer surface of the specimen | 3 min | 15 min | >30 min |
| Inner surface of the specimen (after breaking) | 15 seconds | 5 min | >30 min | the 3-point bending mechanical strength properties, according to the measurement method described below in Example 4:

| Composition | 1 | 2 | 3 |
|---|---|---|---|
| Maximum stress ($\sigma$ max in kN) | 0.3 | 0.35 | 0.51 |

The compression properties of the specimens of compositions 2 and 3 are not prohibitively degraded compared with the specimen of composition 1, despite the lowering in density provided by these compositions 2 and 3.

EXAMPLE 4

Various composite materials of fibrocement type, 5 millimeters thick, were prepared as indicated below.

The composition of the fibrocement used in the examples is as follows:

| | |
|---|---|
| cement sold by Lafarge under the reference HTS 52.5 | 200 g |
| fumed silica sold by Elkem under the reference 940 U | 35 g |
| cellulose extracted from *Pinus radiate* | 10 g |
| polyarnide reinforcing fibers | 5 g |
| additives | 2 g |
| water | 750 g |

The cellulose is first pulped for one hour with vigorous stirring and the other ingredients are then added. After blending for 15 minutes, the mixture is poured into a mold and a primary gentle suction is applied. The resulting cake is then subjected to pressure of 10 tons (10 MPa) in order to form the samples. For each formulation, 6 fibrocement specimens are manufactured: 120×30×5 mm in size.

These specimens are left for 24 hours at room temperature in a chamber saturated with moisture, and are then matured for 24 hours at 60° C. in a chamber that is again saturated with moisture, and finally left for at least 24 hours in an air-conditioned room at 20° C. with a relative humidity (RH) of 65% before testing.

The mechanical tests are performed in 3-point bending (inter-axis: 100 mm), at a test speed of 0.1 mm/min. This test is a standard 3-point bending test. The force-displacement curve is recorded and the equivalent stress corresponding to the maximum load ($\sigma$ max) is calculated. The equivalent stress corresponding to a 2 mm bend of the specimen is also calculated.

In all cases, no sign of cracking is noted on the edges of the specimens, even during long-term ageing of the products.

Table 3 shows the relative increase in the maximum stress obtained during the test of a fibrocement reinforced with additive, compared with the maximum stress obtained during the test of a fibrocement without additive. This relative increase is noted as $\Delta\sigma$ max.

TABLE 3

| Additive | $\Delta\sigma$ max |
|---|---|
| PA acid oligomer | +30% |
| PA AlSNa oligomer | +7% |
| Adipic | +20% |
| Adipic + Latex PAV22 (50/50) | +22% |
| Latex PAV22 | +10% |

The PA acid oligomer is obtained by condensation of adipic acid and hexamethylenediamine with an acid stoichiometry of 20% relative to the equilibrium stoichiometry (1 mol of diacid per 1 mol of diamine) comprising about 8 to 14 units.

The PA AlSNa oligomer is a sodium salt of sulfonated polyamide oligomer obtained by polycondensation of 3 monomers (adipic acid, hexamethylenediamine and sulfonated isophthalic acid) comprising about 8 to 14 units.

PAV22, of trade name Rhoximat® PAV22, is a latex powder based on acetate-versatate copolymer.

Figure 2:
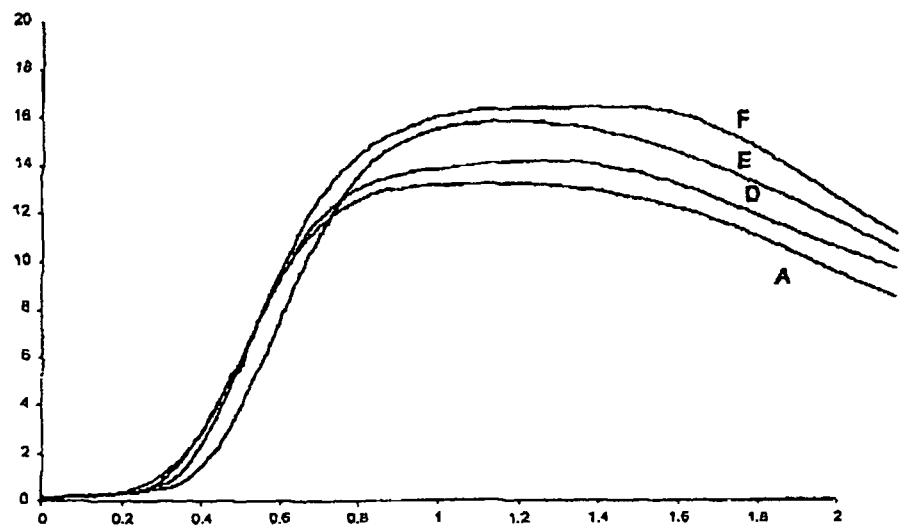
FIG. 2 shows the bending (mm) of fibrocements reinforced with polyamide fibers and adipic and/or latex as a function of bending stress (MPa).

The curves representing the stress tolerated as a function of the bending of the specimen are given in FIG. 1 (fibrocements with polyamide fibers and addition of polyimide oligomers) and in FIG. 2 (fibrocements reinforced with polyimide fibers and addition of adipic and/or latex).

In these figures, the x-axes correspond to the bending of the specimen in millimeters, and the y-axes correspond to the bending stress in MPa.

The polyamide fibers used are the following:

PA 0.6 dtex fiber; this is a polyamide 66 fiber of thin, round cross section, produced by Rhodia Technical Fibers for Flock application. It is a non-twist fiber chopped to 6 mm, the mechanical characteristics of which are especially an elongation at break of 80%.

PA 0.5 dtex fiber; this is a polyamide 66 fibre-fiber of ultra-thin, round cross section, produced by Rhodia Technical Fibers for Flock application. It is a non-twist fiber chopped at 6 mm, the mechanical characteristics of which are especially an elongation at break of 20%.

In FIG. 1:

Curve A corresponds to the polyamide fibers (PA 0.5 dtex fiber) alone;

Curve B corresponds to the mixture of polyamide fibers (PA 0.5 dtex fiber) and of acid polyamide oligomer; and Curve C corresponds to the mixture of polyamide fibers (PA 0.5 dtex fiber) and AlSNa oligomer.

In FIG. 2:

Curve A corresponds to the polyamide fibers (PA 0.6 dtex fiber) alone;

Curve D corresponds to the mixture of polyamide fibers (PA 0.6 dtex fiber) and PAV22;

Curve E corresponds to the mixture of polyamide fibers (PA 0.6 dtex fiber), of adipic acid and of PAV22; and Curve F corresponds to the mixture of polyamide fibers (PA 0.6 dtex fiber) and of adipic acid.

The maximum stress tolerable by the fibrocement is increased in the presence of additives. Furthermore, the ductility of the material may be substantially increased by adding an additive, which represents an appreciable improvement in the working properties.

The results obtained in FIGS. 1 and 2 show the advantage of using fibers with a low yarn count to a maximum gain both in the maximum stress tolerable by the material and in its ductility.

EXAMPLE 5

Various composite materials of fibrocement type, 5 millimeters thick, were prepared as indicated below.

The composition of the fibrocement used in the examples is as follows:

| | |
|---|---|
| cement sold by Lafarge under the reference HTS 52.5 | 200 g |
| fumed silica sold by Elkem under the reference 940 U | 35 g |
| cellulose extracted from *Pinus radiata* | 10 g |
| polyamide reinforcing fibers | 5 g |
| additives | 2 g |
| water | 750 g |

The cellulose is first pulped for one hour with vigorous stirring and the other ingredients are then added. After blending for 15 minutes, the mixture is poured into a mold and a primary gentle suction is applied. The resulting cake is then subjected to a pressure of 10 tons (10 MPa) in order to form the samples. For each formulation, 6 fibrocement specimens are manufactured: 120×30×5 mm in size.

These specimens are left for 24 hours at room temperature in a chamber saturated with moisture, and are then matured for 24 hours at 60° C. in a chamber that is again saturated with moisture, and finally left for at least 24 hours in an air-conditioned room at 20° C. with a relative humidity (RH) of 65% before testing.

The mechanical tests are performed in 3-point bending (inter-axis: 100 mm), at a test speed of 0.1 mm/min. This test is a standard 3-point bending test. The force-displacement curve is recorded and the equivalent stress corresponding to the maximum load ($\sigma$ max) is calculated. The equivalent stress corresponding to a 2 mm bend of the specimen is also calculated.

In all cases, no sign of cracking is noted on the edges of the specimens, even during long-term ageing of the products.

The following additive system was used (the percentages given are weight percentages):

| | |
|---|---|
| Latex PAV22 | 40% |
| Adipic | 40% |
| Geropon T36 | 20% |

These additives are used at a content of 1% by weight relative to the cement.

The fibers used are polyamide PA 6.6 fibers of 78f136 type chopped to 6 mm, or APV RM 182® fibers said by the company Kurarray, chopped to 6 mm.

The maximum stress tolerable by the fibrocement in the presence of fibers (AVP or PA) is maintained in the presence of additives.

Furthermore, the density of the materials is substantially reduced.

Finally, the hydrophobic power is markedly improved in the presence of the additives.

The invention claimed is:

1. A process for improving a cement or fibrocement article's resistance to water uptake, the process comprising:
    mixing a composition comprising
        (i) a cement;
        (ii) an aqueous solution or dispersion of at least one organic compound comprising at least two hydrophilic functions and a hydrophobic chain, or a polyamide oligomer comprising less than 20 repeating units; and
        (iii) an additive selected from the group consisting of a latex and fibers,
        wherein the composition has a water/cement ratio of greater than 1 and less than 3.75; and
    then forming one or more superposed layers of the composition on a surface of the article wherein each layer of the composition has a thickness of less than 5 centimeters.

2. The process according to claim 1, wherein the composition comprises from 0.05% to 10% by weight of the organic compound relative to the total weight of hydraulic binder.

3. The process according to claim 1, wherein the composition comprises from 0.1% to 15% by weight of the latex relative to the total weight of hydraulic binder.

4. The process according to claim 2, wherein the composition comprises from 0.1% to 10% by weight of fibers relative to the total weight of hydraulic binder.

5. The process according to claim 1, wherein the hydrophilic functions of the organic compound are acid, acid halide or acid anhydride functions.

6. The process according to claim 1, wherein the organic compound comprises a hydrophobic chain which is an aliphatic, arylaliphatic, aromatic or alkylaromatic chain.

7. The process according to claim 1, wherein the hydrophobic chain has from 2 to 30 carbon atoms.

8. The process according to claim 1, wherein the organic compound is succinic acid, sebacic acid, adipic acid, octanedioic acid, decanedioic acid, dodecanoic acid, brassylic acid, glutaric acid, or a salt thereof.

9. The process according to claim 8, wherein the organic compound is a mixture of adipic acid, glutaric acid and succinic acid.

10. The process according to claim 1, wherein the latex is a water-insoluble film-forming polymer prepared from at least one ethylenically unsaturated monomer.

11. The process according to claim 10, wherein the ethylenically unsaturated monomer is styrene, butadiene, $C_1$-$C_{12}$ alkyl acrylic, methacrylic ester, a corresponding acid thereof, or a vinyl ester.

12. The process according to claim 10, wherein the water-insoluble film-forming polymer is selected from the group consisting of vinyl homopolymers, acrylate homopolymers, copolymers of vinyl acetate, copolymers of styrene/butadiene, copolymers of styrene/acrylate, copolymers of acrylic esters and copolymers of styrene/butadiene/acrylate.

13. The process according to claim 1, wherein the fibers are selected from the group consisting of glass fibers, carbon fibers, steel fibers, polyamide fibers, polyester fibers, poly(vinyl alcohol) fibers, polypropylene fibers and poly(acrylonitrile) fibers.

14. The process according to claim 1, wherein said hydraulic binder is based on at least one compound selected from the group consisting of calcium silicate, calcium sulfate and calcium phosphate.

15. A process for manufacturing an article of cement or fibrocement having improved resistance to water uptake, the process comprising forming one or more superposed layers on a surface of the article, wherein each layer has a thickness of less than 5 centimeters and wherein each layer is formed with a composition comprising (i) a cement and (ii) en aqueous solution or dispersion of at least one organic compound comprising at least two hydrophilic functions and a hydrophobic chain, or a polyamide oligomer comprising less than 20 repeating units, and wherein the composition has a water/cement ratio of greater than 1 and less than 3.75.

* * * * *